(12) United States Patent
Eriksen (10) Patent No.: US 10,688,619 B2
(45) Date of Patent: Jun. 23, 2020

(54) ABRASION ARRANGEMENT FOR SANDING HEAD

(71) Applicant: Klingspor A/S, Aarhus C (DK)

(72) Inventor: Keld Eriksen, Vejle (DK)

(73) Assignee: Klingspor A/S, Aarhus C (DK)

( * ) Notice: Subject to any disclaimer, the term of this patent is extended or adjusted under 35 U.S.C. 154(b) by 164 days.

(21) Appl. No.: 15/751,895

(22) PCT Filed: May 18, 2016

(86) PCT No.: PCT/DK2016/050135
§ 371 (c)(1),
(2) Date: Feb. 12, 2018

(87) PCT Pub. No.: WO2017/025093
PCT Pub. Date: Feb. 16, 2017

(65) Prior Publication Data
US 2018/0236628 A1 Aug. 23, 2018

(30) Foreign Application Priority Data
Aug. 12, 2015 (DK) .................................. 2015 70524

(51) Int. Cl.
*B24B 19/26* (2006.01)
*B24B 49/16* (2006.01)
(Continued)

(52) U.S. Cl.
CPC .............. *B24B 19/26* (2013.01); *B24B 19/14* (2013.01); *B24B 27/0038* (2013.01); *B24B 49/16* (2013.01); *B25J 11/0065* (2013.01)

(58) Field of Classification Search
CPC ......... B23Q 11/08; B24B 19/14; B24B 19/26; B24B 27/0038; B24B 33/081;
(Continued)

(56) References Cited

U.S. PATENT DOCUMENTS 5,509,848 A 4/1996 Shimbara
8,914,153 B2 * 12/2014 Vila Papell ............ B25J 9/1684
700/258
(Continued)

FOREIGN PATENT DOCUMENTS

CN 202894940 U 4/2013
EP 0444657 A1 9/1991
(Continued)

*Primary Examiner* — George B Nguyen
(74) *Attorney, Agent, or Firm* — James Creighton Wray (57) ABSTRACT

The invention concerns a sanding head for an abrasion arrangement, where the sanding head comprises an abrading drum with a centre axis and contact wheels at both ends of the abrading drum, where the contact wheels have the same or substantially the same centre axis as the abrading drum, and where the sanding head comprises a suspension swivel arrangement, and where the sanding head comprises at least one load sensor connected to at least one contact wheel. The invention also concerns an abrasion arrangement and a use of a sanding head. The object of the invention is to ensure an equal contact on the abrading drum as well as an equal contact over the entire length of the abrading drum, and where the invention can be used on plane, convex and/or concave surfaces.

11 Claims, 9 Drawing Sheets

(51) Int. Cl.
*B24B 19/14* (2006.01)
*B24B 27/00* (2006.01)
*B25J 11/00* (2006.01)

(58) Field of Classification Search
CPC ....... B24B 49/16; B24B 55/04; B24B 55/052; B24B 55/06; B24B 55/102; B25J 11/0065
See application file for complete search history.

(56) References Cited

U.S. PATENT DOCUMENTS

| | | | |
|---|---|---|---|
| 9,597,799 | B2* | 3/2017 | Windprechtinger ... B25J 9/0096 |
| 2012/0322349 | A1* | 12/2012 | Josi .......................... B24B 19/14 451/73 |
| 2015/0283665 | A1* | 10/2015 | Heilig ..................... B24B 19/14 29/889.23 |
| 2019/0054615 | A1* | 2/2019 | Ulliman ..................... B25J 5/00 |
| 2019/0111570 | A1* | 4/2019 | Naderer .............. B24B 27/0015 |

FOREIGN PATENT DOCUMENTS

| | | | |
|---|---|---|---|
| EP | 1410873 | A2 | 4/2004 |
| EP | 2495074 | A2 | 9/2012 |
| EP | 2590781 | A1 | 5/2013 |
| GB | 2352417 | A | 1/2001 |
| JP | H0760634 | A | 3/1995 |
| TW | 200940186 | A | 10/2009 |
| WO | 2008077398 | A1 | 7/2008 |
| WO | 2012003828 | A1 | 1/2012 |
| WO | 2012072085 | A1 | 6/2012 |
| WO | 2014057061 | A1 | 4/2014 |

* cited by examiner

ABRASION ARRANGEMENT FOR SANDING HEAD

FIELD OF THE INVENTION

The present invention relates to an abrasion arrangement for surface treatment with constant velocity at the surface, where the abrasion arrangement comprises at least a sanding head.

The present invention also relates to a sanding head for an abrasion arrangement, where the sanding head comprises a rotating abrading drum with a centre axis, where said abrading drum is arranged rotatable about said centre axis.

The invention further relates to the use of an abrasion arrangement.

BACKGROUND OF THE INVENTION

Long before the development of the present invention, it was known to conduct sanding with hand-held power tools. However, hand-held power tools have a lot of unfortunate and hazardous impacts on operators, like e.g. white fingers, static electricity, repetitive work, and massive quantities of dust. Apart from this, the operators had to work from various platforms, ladders and lifts which add further to an unsafe working environment.

From EP 2590781 it is known to conduct sanding by means of an automatic abrasion arrangement comprising an abrading drum mounted on a robotic arm and where control means are used e.g. for positioning the drum on the surface upon which the drum is to abrade, to control the force by which the drum is pressed towards the surface, and to control the velocity by which the drum is moved with respect to the surface.

One of the disadvantages of this abrasion arrangement is that the contact between the surface and the drum is not measured at both ends of the drum. It is therefore uncertain if the contact between the surface and the drum actually is the same over the whole length of the drum.

Another disadvantage of this abrasion arrangement is the lack of contact wheels at both ends of the drum to control the engagement of the abrading drum in relation to the surface that has to be abraded. It is therefore uncertain to what extent the surface becomes a uniform/even treatment from the abrading drum during the abrading process, and the uncertainty becomes even bigger when the surfaces are curved or even double curved surfaces such as e.g. on a blade for a wind turbine.

OBJECT OF THE INVENTION

The object of this invention is to provide an abrasion arrangement which is able to conduct all operations in all angles within 180 degrees from top to bottom, no matter the curvature of the treated surface and with constant velocity at the surface. The object is also to provide an abrasion arrangement which is able to—at all times—to adopt to the surface geometry and to the abrasion velocity without programming.

The object of this invention is therefore also to provide a sanding head for an abrasion arrangement of the type mentioned in the introduction which ensures an equal contact between an abrading drum and the surface to be abraded over the entire length of the abrading drum.

It is a further object of the invention to provide a sanding head which ensures that the rotating abrading drum is parallel to the surface.

It is yet a further object of the invention to provide a sanding head which ensures an equal contact between the surface and the abrading drum no matter at what angle the sanding head is turned or adjusted according to its fastening/suspension arrangement, as long as the abrading drum is parallel to the surface.

It is also an object of the invention to make it possible to optimise the suction in a shielding housing arranged around at least the rotating abrading drum of a sanding head, hence optimising the suction of abrasion dust and minimising false air intake.

It is a further object of the invention to focus on the health and safety of the operators.

It is also an object of the invention to be able to use the sanding head in relation with abrading large surfaces, whether the surfaces are plane, convex and/or concave; the way it is known from traditional wind turbine blades with single or double curved surfaces.

DESCRIPTION OF THE INVENTION

In a first aspect, the present invention relates to an abrasion arrangement for surface treatment with constant velocity at the surface, where the abrasion arrangement comprises at least a sanding head, where the sanding head is connected to at least an abrasion pressure comprising at least an abrasive pressure cylinder with an absolute encoder, where the abrasion pressure is further connected to at least a tilt device which is further connected to a structural construction comprising a horizontal arm and an horizontal actuator further comprising drive means, and where at least the horizontal arm is even further connected to a vertical arm with drive means.

This makes it possible to use a standard hand operated palletizer unit with a vertical arm and connect the vertical arm to a horizontal arm into an easy to operate semiautomatic flexible unit. Other options are available, e.g. to make a more automatic tower or bridge installation fixated to rails or fixated to pathways. When a surface is to be treated, the sanding head becomes in contact with a surface and makes e.g. a first vertical movement of the sanding head in relation to the surface. When the first vertical movement is finished, the sanding head is then moved to a new position e.g. next to the previously one i.e. the distance of the length of the abrading drum or preferably a little less, where the sanding head then becomes in contact with a surface and makes e.g. a second vertical movement of the sanding head in relation to the surface.

The signal from the encoder adjust at least the horizontal arm, which means that the abrading head is able to adopt to at least all positions from 0-180 degrees from top to bottom of a surface giving that the surface is facing the abrading head. By using an abrasion pressure with an abrasive pressure cylinder with an absolute encoder instead of just using a damper it is thus possible to make smaller adjustments continuously.

Thus, by means of an abrasion pressure with an abrasive pressure cylinder with an absolute encoder, the signal from the absolute encoder ensures that the horizontal positioning is dynamic and always regulated to the given double-curved geometry.

In a preferred embodiment, the drive means for driving the vertical arm and the horizontal arm are compressed air cylinders, with a single stroke or in the form of a telescope cylinder. Other drive means for driving the vertical arm and the horizontal arm using belts, tracks or suspensions are possibilities as well.

With a pneumatic contact cylinder the flexible motion is essential as it works as a buffer in the movement of the sanding head from a position where the contact pressure is too low or too high and to a position where the contact pressure is as intended and in the direction towards or away from the surface. This is necessary to avoid that the contact pressure could raise or drop uncontrollable.

In a second aspect, the present invention relates to an abrasion arrangement for surface treatment with constant velocity at the surface, where the absolute encoder has a 70 mm linear moving distance with a set point at 35 mm.

The absolute encoder could e.g. be mechanical, optical or magnetically where the abrasive pressure cylinder has a cylinder function with a linear moving distance that could be from 40 mm to 100 mm and with a set point at 20 mm to 50 mm, however preferably the linear moving distance is 70 mm with a set point at 35 mm.

In a third aspect, the present invention also relates to an abrasion arrangement for surface treatment with constant velocity at the surface, where the abrasion arrangement further comprises at least one of: load sensor, distance sensor.

This makes it possible for the abrasion arrangement to conduct a search for the upper edge or lower edge of a surface and then find the right position to initiate the sanding procedure. It could for example be surfaces such as e.g. on a blade for a wind turbine, where the blade is positioned with the leading edge facing downwards and the trailing edge facing upwards. When the trailing edge/upper edge or the leading edge/lower edge is detected then the right position is found for initiating the sanding procedure.

According to a fourth aspect of the invention, the above object is achieved with a sanding head of the type mentioned in the introduction, where the sanding head comprises an abrading drum with a centre axis, where said abrading drum is arranged rotatable about said centre axis, and where the sanding head further comprises at least a contact wheel at both ends of the abrading drum, where the contact wheels have the same or substantially the same centre axis as the abrading drum, and where the sanding head comprises a suspension swivel arrangement and where the sanding head comprises at least one load sensor connected to at least one contact wheel.

This makes it possible to provide a sanding head for an abrasion arrangement which ensures an equal contact over the entire length of the abrading drum. This is ensured when the sanding head faces the surface to be abraded and the contact wheels both have made contact with the surface. When both contact wheels are in contact with the surface, then the sanding head has been able to turn/adjust due to the suspension swivel arrangement that connects the sanding head to a structural construction which will be explained in further detail below. The centre axis of the abrading drum of the sanding head is then parallel to the surface. In a preferred embodiment is a line through the centre axis of the abrading drum, the centre axis of the contact wheel and the contact between the sanding head and the surface perpendicular to the surface.

This further makes it possible to use the sanding head in relation with abrading large surfaces, where the surfaces can be plane, convex and/or concave; the way it is known from traditional wind turbine blade. The surface may thus be either: plane; convex; concave; plane and convex; plane and concave; plane, convex and concave; convex and concave, meaning that any possible combination of surface shapes may be treated with a sanding head as mentioned above. It is however mandatory that the surface is more or less linear in the direction corresponding to the direction of the center axis of the abrading drum.

The length of the abrading drum has an appropriate length which is chosen according to the shape of the surface which it is to be used upon, and it could for example be between 500 and 1000 mm. However, shorter or longer length of the drum is of course possible options if needed or if the shape of the surface in questions makes it necessarily or possible.

The diameter of the abrading drum may also vary depending on the curvature of the surface to be abraded, but a typical diameter could be between 200 to 500 mm, however larger or smaller diameters could be used according to specific needs.

The at least one contact wheel at either end of the abrading drum has the same or substantially the same centre axis as the abrading drum. Thus, in a preferred embodiment, the wheels have a size with a diameter which is close to the diameter of the abrading drum, however a size that makes it possible to adjust the wheel position. By adjusting the wheel position the wheels can be moved towards or away from the surface, so that the distance between the outer periphery of the abrading drum and the outer periphery of the wheels becomes larger or smaller. The distance between the outer periphery of the abrading drum and the outer periphery of the wheels is chosen according to the process of abrasion e.g. whether it is a roughly or finely abrasion.

If the diameter of the abrading drum is 200 mm the diameter could e.g. be 175 mm and if the diameter of the abrading drum is 500 mm the diameter could e.g. be 425 mm, however larger or smaller scales could be used according to specific needs.

With the suspension swivel arrangement between the sanding head and the structural construction an equal contact between the abrading drum and the surface is ensured, no matter at what angle the sanding head is turned according to its fastening, as long as the abrading drum is parallel to the surface.

The swivel arrangement is in one embodiment able to turn about at least one axis. Preferably about an axis which if e.g. situated in a vertical plane is perpendicular to the centre axis of the abrading drum which is then in a horizontal plane, thus making it possible to turn the sanding head either to the right or to the left.

The first axis could in another embodiment be in a plane which is not perpendicular to the centre axis of the abrading drum, as long as the abrading drum is ensured a unified contact with the surface.

In a further embodiment, the swivel arrangement is also able to turn about a second axis which if e.g. situated in a horizontal plane s is parallel to the centre axis of the abrading drum which is then also situated in a horizontal plane, thus making it possible to raise or lower the sanding head.

The sanding head is in a preferred embodiment freely moveable and regulated in the horizontal plane and preferably through the centre axis of the abrading drum.

A large number of options are available for the swivel arrangement and the contact wheels to be connected to the sanding head. One option is an open U-shaped bracket suspension connected to the abrading drum and where the swivel arrangement and contact wheels could also be fastened. Another and preferred option is the use of a more closed shielding housing which makes it possible to solve issues directed towards the health and safety of the operators. A more closed shielding housing makes it possible to enclose the abrasion dust within the sanding head and through a later mentioned and explained dust extraction to handle the dust in a safe and secure manner. The sanding head can be arranged in a large number of possible ways, as part of a structural construction such as a tower, a portal, a palletizer or a truck arrangement. What is most important though is the flexibility of the sanding head to be able to treat a surface in the correct way and with the correct contact.

Abrading drums are well known and can, in one embodiment, comprise a number of abrasive lamellae/sanding strips with support brushes on the backside of the abrasive lamellae, where the support brushes substantially have the same length as the lamellae/sanding strips. The surface of the abrading drum is thus not a firm and regular cylindrical surface, but may be comprise a rather large number of brushes and sanding strips, which is a common type of sanding heads.

Load sensors as mentioned above may be ordinary electric load sensors but can also be other types of sensors that are capable of detecting a certain load or pressure. It will e.g. be possible to use pneumatic actuators coupled to a pressure sensor in a closed circuit, where the pressure will build up as the actuator is forced against a surface. When a certain pressure is measured by the pressure sensor the correct pressure is obtained between the sanding head and the surface of the object to be abraded. Also a sensor comprising a mechanical spring or a hydraulic actuator may be used.

In a preferred embodiment is the load sensor a weighing cell or a load cell e.g. strain gauge, pneumatic or piezoelectric load cell.

In a fifth aspect, the present invention also relates to a sanding head for an abrasion arrangement, where at least one load sensor is connected to at least one contact wheel at both ends of the abrading drum.

This makes it possible to measure and ensure an equal contact over the entire length of the abrading drum. When the values measured on both contact wheels are equal, then the position and the contact i.e. the contact pressure between the wheels are correct which indirectly also gives the correct engagement of the abrading drum in relation to the surface to be abraded.

This is an advantage when operating with surfaces changing between concave, convex and plane and a combination of several curved surfaces at the same time, thus also surfaces being double curved.

It is important that the contact pressure is not too high—it could then happen to damage or even crush the surface of the subject to be abraded—and it is therefore extremely important to measure, regulate and control the pressure. Therefore the pressure measured by the load sensors are used to control that the pressure put on the sanding head e.g. by a pneumatic contact cylinder is optimal. With optimal means herein the wanted and needed pressure. The pressure is proportional so an even contact pressure is achieved no matter what direction/angle the sanding head has.

In a preferred embodiment, the load sensors can be placed between the suspension of the wheel and the shielding housing.

In another embodiment, the load sensors can be placed between the axle of the wheel and the wheel suspension.

The adjustment of the contact is preferably added by a pneumatic contact cylinder to e.g. 30 kg. Other choices of contact can be chosen as well. Alternative embodiments can be electrical or hydraulically actuators.

In a sixth aspect, the present invention also relates to a sanding head for an abrasion arrangement, where the sanding head further comprises suspension means for the contact wheels where the suspension means comprises adjusting screws or similar adjustment means.

By means of the adjusting screws and the adjustable suspension means it is possible to move the contact wheels in a preferred embodiment individually or in another embodiment simultaneously according to the sanding head and the abrading drum.

This makes it possible to use the same pair of contact wheels and adjusting the distance between the outer periphery of the contact wheels and the outer periphery of the abrading drum where the peripheries are supposed to touch the surface.

The adjustable suspension means can in one embodiment be slidable means where a first part is positioned at the end of the sanding head and where a second part is adjustable along at least the first part in e.g. a groove.

In a preferred embodiment, the difference between the outer periphery of the contact wheels and the outer periphery of the abrading drum can be between 15 and 30 mm to the abrading side of the abrading drum.

Alternatively, it is also possible to change the contact wheels to another diameter, hence achieving the same result, namely that the distance between the outer periphery of the abrading drum and the outer periphery of the wheels becomes larger or smaller.

In a seventh aspect, the present invention also relates to a sanding head for an abrasion arrangement, where the sanding head further comprises at least one distance sensor at either the first side or the second side of the abrading drum.

With a first side and a second side means herein the sides in opposite direction from the centre axis of the abrading drum and where the first side and a second side is on opposite sides of the contact area between the abrading drum and the surface. This makes it possible to measure the distance to the surface. If a plane (wherein the line of intersection between the surface and the abrading drum and the centre axis of the abrading drum is) is perpendicular to the surface, then the correct and most optimal abrading takes place. The centre axis of the contact wheels can preferably be within the mentioned plane to make the control and operation of the sanding head easier.

In another embodiment the sanding head a distance sensor at both the first side and the second side of the abrading drum.

With the positioning of the sensor or sensors and the measurements obtained it is thus possible to control whether the sanding head is perpendicular to the surface or not.

This measurement and control can be done regardless of the suspension swivel arrangement.

With the measurements on both sides of the abrading drum it is thus possible to adjust the sanding head in a way where the sanding head is perpendicular to the treated surface and whereby the surface obtains the correct abrading.

The distance sensor or sensors can be e.g. infrared sensors or ultrasonic sensors—or both—used on the first side and/or the second side of the abrading drum to measure the distance from the sanding head and thus the abrading drum to the surface. The measurements provide input to a not further described control system which can determine the position of the sanding head and thus control the operation. This makes it possible to use the sanding head for an abrasion arrangement, where the sanding head will adapt to the surface without programming of the abrasion arrangement.

In one embodiment several distance sensors can be placed at the first side or at the second side or at both the first side and the second side of the abrading drum. This could e.g. be done to ensure an equal distance to the surface at either ends of the abrading drum.

In an eight aspect, the present invention also relates to a sanding head for an abrasion arrangement, where the sanding head further comprises a shielding housing comprising a front, a back, a first side and a second side, a first end and a second end, an inside, an outside and where the front has an opening to the inside of the shielding house where the abrading drum is positioned and where the abrading drum has its centre axis between the first end and the second end of the shielding housing, where the contact wheels are positioned at the first end and the second end on the outside of the shielding housing and where the swivel is positioned at the back of the shielding housing and where the shielding housing further comprises a dust extraction outlet.

This makes it possible to embed the abrasion dust inside a house, remove the dust by extraction and to ensure the health and safety of the operator. It also makes it possible to connect e.g. the swivel arrangement, the dust extraction etc. directly or indirectly to the shielding housing.

The dust extraction outlet makes it possible to dispose the abrasion dust from the shielding housing, and, in a preferred embodiment, to connect the dust extraction outlet by means of flanges, hoses etc. to an air extraction system at site or to an external filter unit. With the correct and preferred position of the abrading drum perpendicular to the surface, the gap or the suction distance between the shielding housing and the surface is the same at both sides of the shielding housing. This enhances the optimal abrasion dust extraction.

As mentioned above, several distance sensors can be placed at the first side or at the second side or at both the first side and the second side of the abrading drum. This could also ensure that the opening between the shielding housing and the surface is as wanted at both sides of the abrading drum. The openings on both sides of the drum might not necessarily be equal in size, as a smaller opening might be preferred at one side e.g. the side towards which the abrading takes place and where the dust is carried to.

In a ninth aspect, the present invention also relates to a sanding head for an abrasion arrangement, where the sanding head further comprises a blower connected to the dust extraction outlet.

With an effective blower positioned directly at the sanding head or in immediately connection to the sanding head it is thus possible to obtain a faster and more efficient suction function right at the sanding head and without longer hose connections. From the blower the abrasion dust is lead to a mobile filter unit or a central extraction.

In a tenth aspect, the present invention also relates to the use of a sanding head, in abrading surface treatment of wind turbine blades, and, in a eleventh aspect, the present invention also relates to the use of a sanding head, where the sanding head moves from an upper position close to the top of the trailing edge of the blades to a lower position close to the bottom of the leading edge, taken that the blade is positioned with the leading edge facing downwards and the trailing edge facing upwards.

This makes it possible to keep the sanding head with a rotational axis at least substantially parallel to the longitudinal axis of the wind turbine blade and also to the surface of a wind turbine blade.

During the surface treatment, the sanding head moves either from the trailing edge of the blade in the upper position to the leading edge closest to the floor or from the leading edge closest to the floor to the trailing edge of the blade in the upper position. With these options the sanding head becomes very flexible and effective.

DESCRIPTION OF THE DRAWING

The invention will be described in further detail below by means of non-limiting embodiments with reference to the drawing, in which.

In the drawing, the following reference numerals have been used for the designations used in the detailed part of the description:

1 Abrasion arrangement
2 Vertical arm
3 Drive means, vertical arm
4 Horizontal arm
5 Drive means, horizontal arm
6 Sanding head
7 Surface
8 Top, surface
9 Bottom, surface
10 Abrading drum
11 Centre axis, abrading drum
12 Contact wheel
13 Centre axis, contact wheel
14 Shielding housing
15 Front, shielding housing
16 Back, shielding housing
17 First side, shielding housing
18 Second side, shielding housing
19 First end, shielding housing
20 Second end, shielding housing
21 Inside, shielding housing
22 Outside, shielding housing
23 Opening, shielding housing
24 Distance sensor
25 First side, abrading drum
26 Second side, abrading drum
27 Suspension swivel arrangement
28 Dust extraction outlet
29 Load sensor
30 Suspension means, contact wheel
31 Set screw, suspension means
32 Actuator
33 Horizontal plane
34 Angle
35 Plane
36 Sanding strip
37 Adjustment sliding guide 38 Blower
39 Tilt device
40 Abrasion pressure
41 Abrasive pressure cylinder
42 Absolute encoder
A Distance between the distance sensor 24 and the surface 7

DETAILED DESCRIPTION OF THE INVENTION

Figure 1:
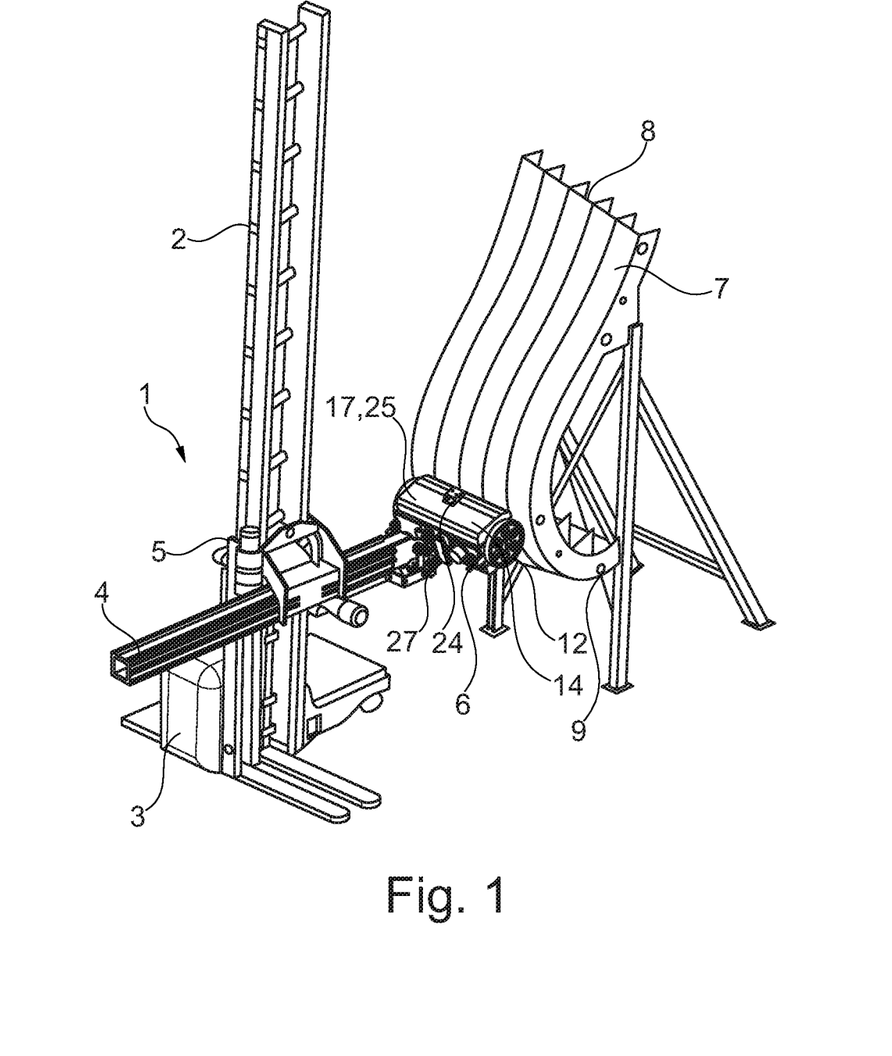
FIG. 1 shows a perspective view of an abrasion arrangement

FIG. 1 shows a perspective view of an abrasion arrangement 1 which in this example is a mobile unit having a vertical arm 2 in the form of a tower. The vertical arm 2 has drive means 3 e.g. electrically or pneumatically driven cylinders, and the vertical arm 2 is connected to a horizontal arm 4. The drive means 3 makes it possible to drive the horizontal arm 4 in the direction of and up and down the vertical arm 2.

The horizontal arm 4 also has drive means 5 e.g. electrically or pneumatically driven cylinders, and the horizontal arm 2 is connected to a sanding head 6. The drive means 5 makes it possible to drive the sanding head 6 in the direction of and towards and away from the vertical arm 2.

When the mobile abrasion arrangement 1 is operated and positioned at an item e.g. a blade for a wind turbine, the vertical arm 2 is by means of the drive means 3 able to position the horizontal arm 4 at the appropriate level, which is determined by later mentioned distance sensors 24. Positioned at the right level the horizontal arm 4 is by means of the drive means 5 able to position the sanding head 6 at the appropriate distance to the surface determined by the distance sensors 24 and positioned with the right pressure towards a surface 7 which is determined by later mentioned load sensors 29.

FIG. 1 show the abrasion arrangement 1 positioned at the surface 7 which the arrangement 1 is treating.

Figure 2:
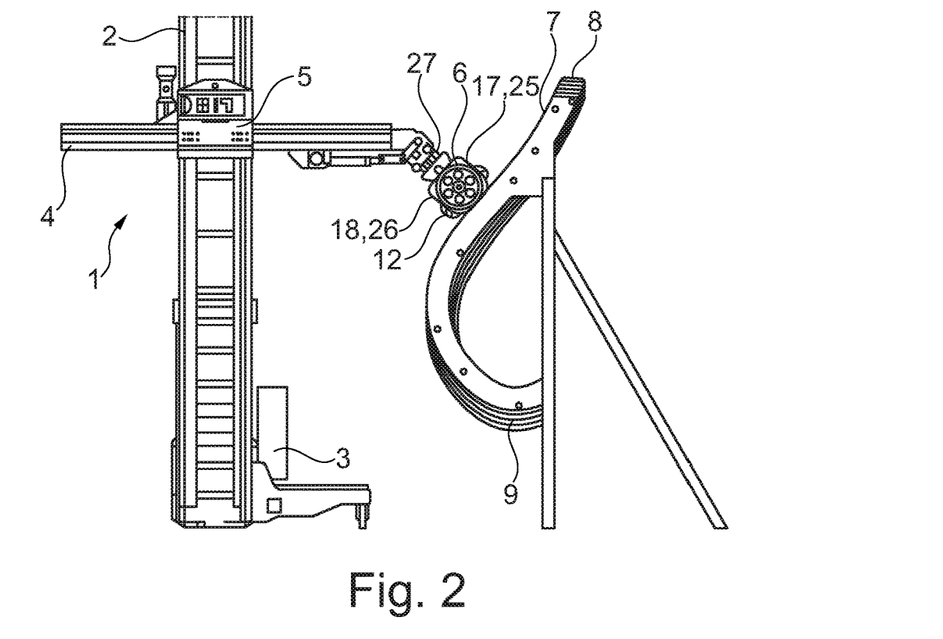
FIG. 2 shows a first side view of the abrasion arrangement shown in FIG. 1
Figure 3:
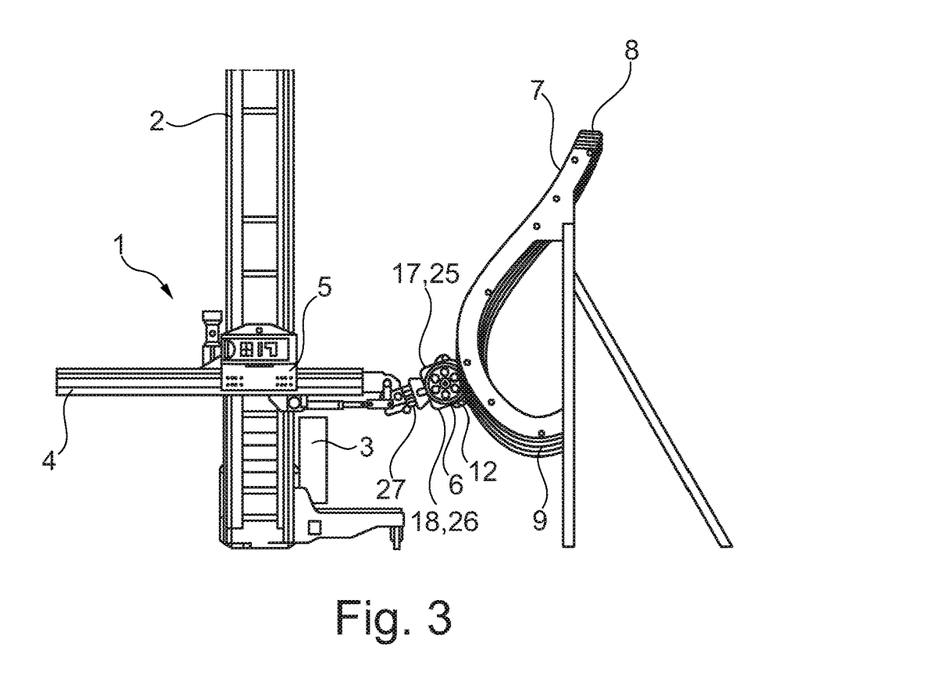
FIG. 3 shows a second side view of the abrasion arrangement shown in FIG. 1
Figure 4:
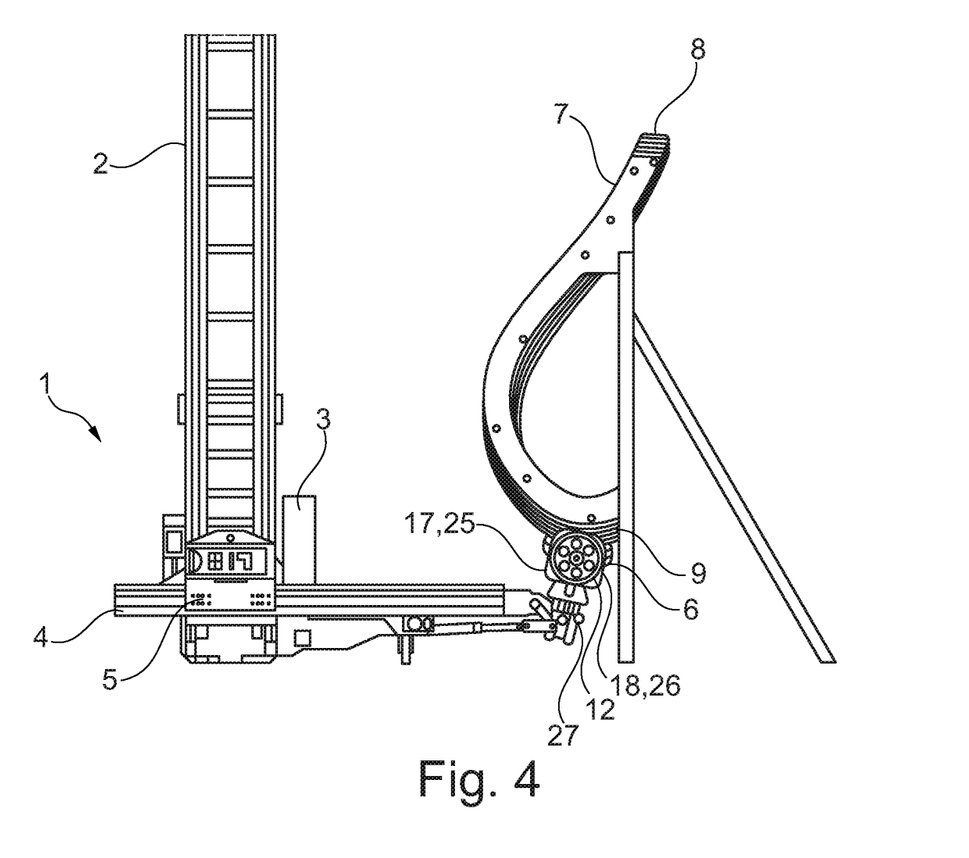
FIG. 4 shows a third side view of the abrasion arrangement shown in FIG. 1

FIGS. 2, 3 and 4 show a first, second and third side view respectively of the abrasion arrangement 1 shown in FIG. 1, where the sanding head 6 moves along the surface 7 from an upper position close to the top 8 to a lower position close to the bottom 9.

Figure 5:
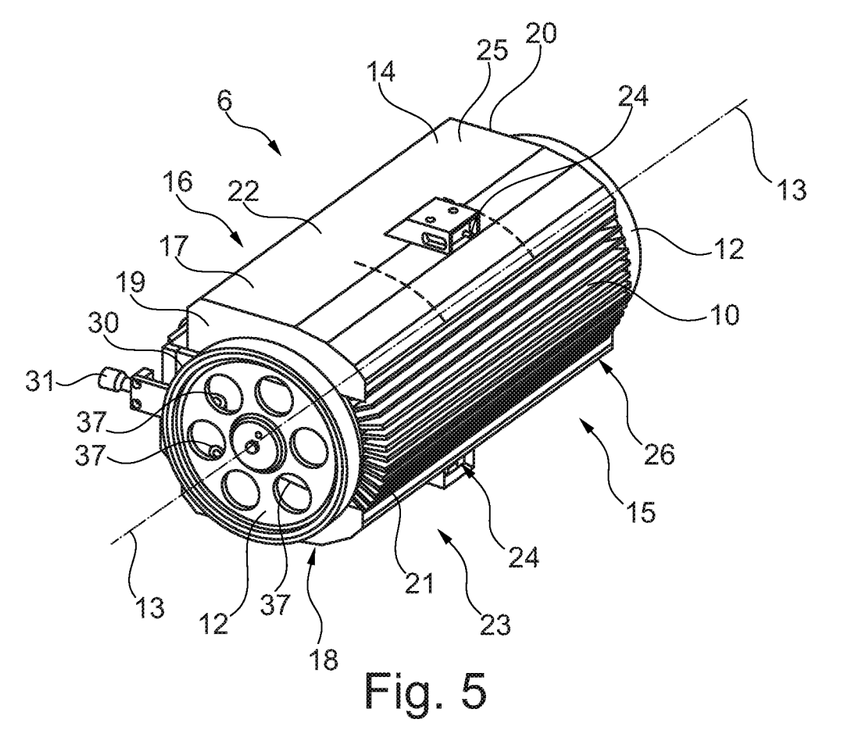
FIG. 5 shows a perspective view of a sanding head

FIG. 5 shows a perspective view of a sanding head 6, where the sanding head 6 has an abrading drum 10 with a centre axis 11, a contact wheel 12 at both ends of the drum 10, where the contact wheels 12 have the same centre axis 13 as the abrading drum 10.

The figure also shows that the sanding head 6 has a shielding housing 14 with a front 15, a back 16, a first side 17 and a second side 18, a first end 19 and a second end 20, an inside 21, an outside 22 where the front 15 has an opening 23 to the inside 21 of the shielding house 14. The abrading drum 10 is positioned inside the shielding house 14 and has its centre axis 11 between the first end 19 and the second end 20, where the contact wheels 12 are positioned at the first end 19 and the second end 20 on the outside 22.

Furthermore, the sanding head 6 has a distance sensor 24 at both the first side 25 and the second side 26 of the shielding housing 14.

Figure 6:
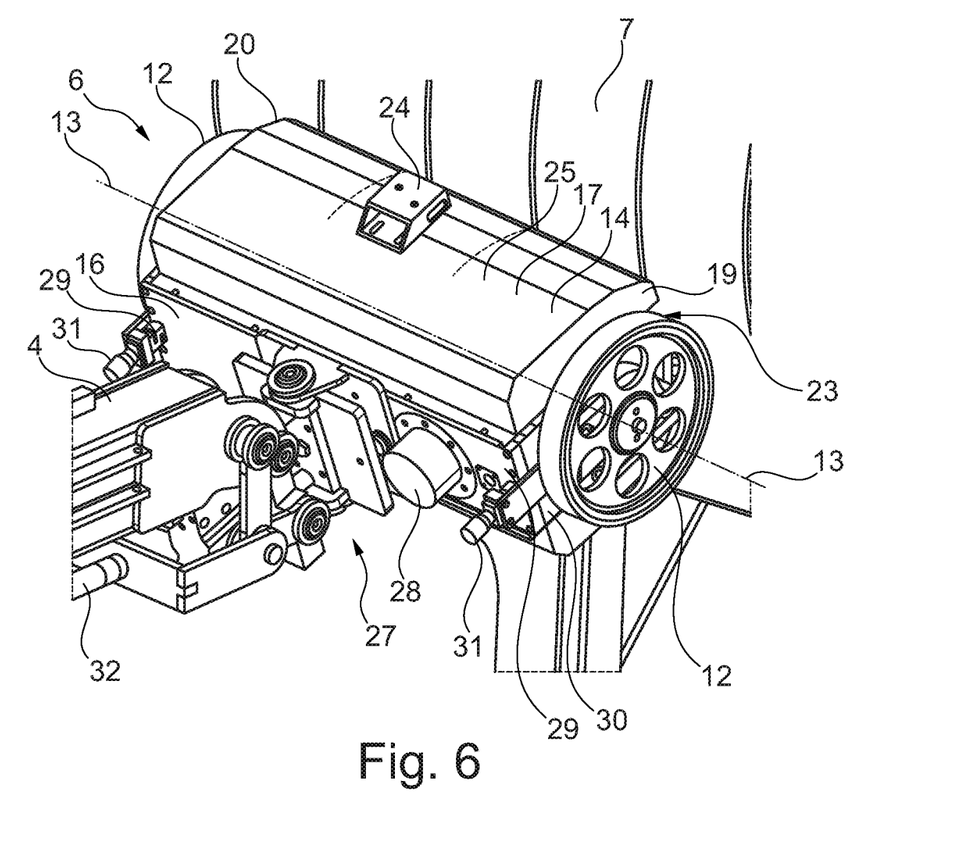
FIG. 6 shows another perspective view of a sanding head

FIG. 6 shows another perspective view of a sanding head 6 where the sanding head 6 further has a suspension swivel arrangement 27 which is connected to a horizontal arm 4. The swivel arrangement 27 is positioned opposite the sanding heads working area and, in this example, at the back 16 of the shielding housing 14. As it is shown on this figure and the two following figures, it is, by means of the swivel arrangement 27, possible to change and adjust the direction of the sanding head 6 in horizontal and/or in vertical position. This ensures that the sanding head 6 and the contact wheels 12 can be brought in contact with the surface 7.

The figure also shows that the shielding housing 14 has a dust extraction outlet 28, however the hose used for leading the abrasion dust away is omitted from this figure. Furthermore, the sanding head 6 has a load sensor 29 which is connected to the suspension means 30 for each of the contact wheels 12. Suspension means 30 has adjusting screws 31 in order to adjust the centre axis 13 of the contact wheels 12 according to the treated surface 7.

Figure 7:
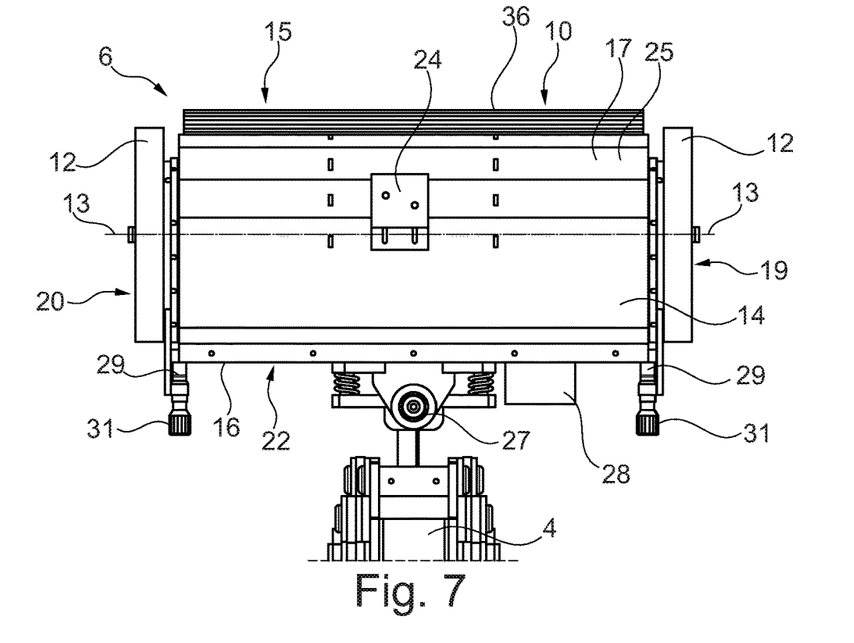
FIG. 7 shows a view of a sanding head seen from the first side

FIG. 7 shows a view of a sanding head 6 seen from the first side 25, where it can be seen how the contact wheels 12 are adjusted in comparison with the abrading drum 10 and how much of the abrading drum 10 that will get in contact with the surface 7.

Figure 8:
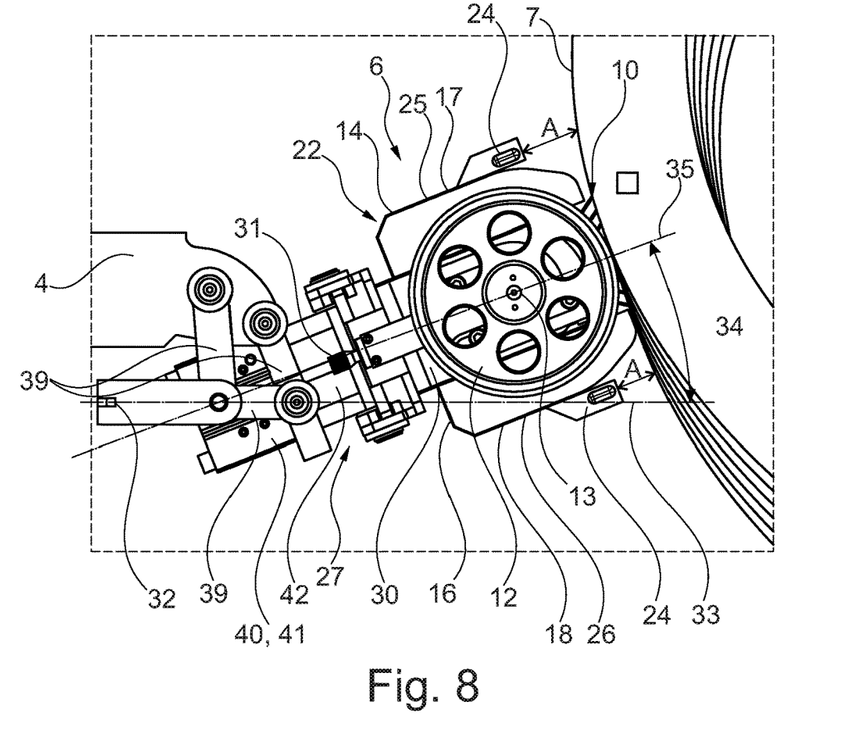
FIG. 8 shows a side view of a sanding head

FIG. 8 shows a side view of a sanding head 6, where the sanding head 6 is in a position similar to the position shown in FIG. 3.

As previously mentioned, it is also shown on this figure how it, by means of the swivel arrangement 27, is possible to change and adjust the direction of the sanding head 6 in horizontal and/or in vertical position. Where the horizontal arm 4 is able to change the movement in the horizontal direction, the shown actuator 32 parallel with and below the horizontal arm 4 is able to change the angle 34 from 0 degrees in a horizontal plane 33 to e.g. 5-10 degrees in the horizontal plane 33 as shown on the figure. The actuator 32 is e.g. electrically or pneumatically driven and it ensures that the contact wheels 12 are in contact with the surface 7.

FIG. 8 also shows the distance sensor 24 at the first side 25 and the second side 26 of the abrading drum 10, where it is possible to measure the distance A to the surface 7. If a plane 35 (wherein the line of intersection between the surface and the abrading drum 10 and the centre axis of the abrading drum 10 is) is perpendicular to the surface 7, then the correct abrading takes place. The centre axis 13 of the contact wheels 12 is within the mentioned plane 35 which then makes the control and operation of the sanding head 6 easier. It is however to be understood that a small deviation from the above mentioned position may occur during operation but the intention is to maintain the plane 35 perpendicular to the surface 7 when possible.

FIG. 8 also shows the abrasion pressure 40 with a pneumatic abrasive pressure cylinder 41 and further with an absolute encoder 42. The absolute encoder 42 is able to control the movement of the horizontal arm 4, where the horizontal arm 4 is able to make large adjustments and where the actuator 32 is able to make small adjustments and where the horizontal arm 4 and the actuator 32 by means of a tilt device 39 is connected to the abrasion pressure 40.

Figure 9:
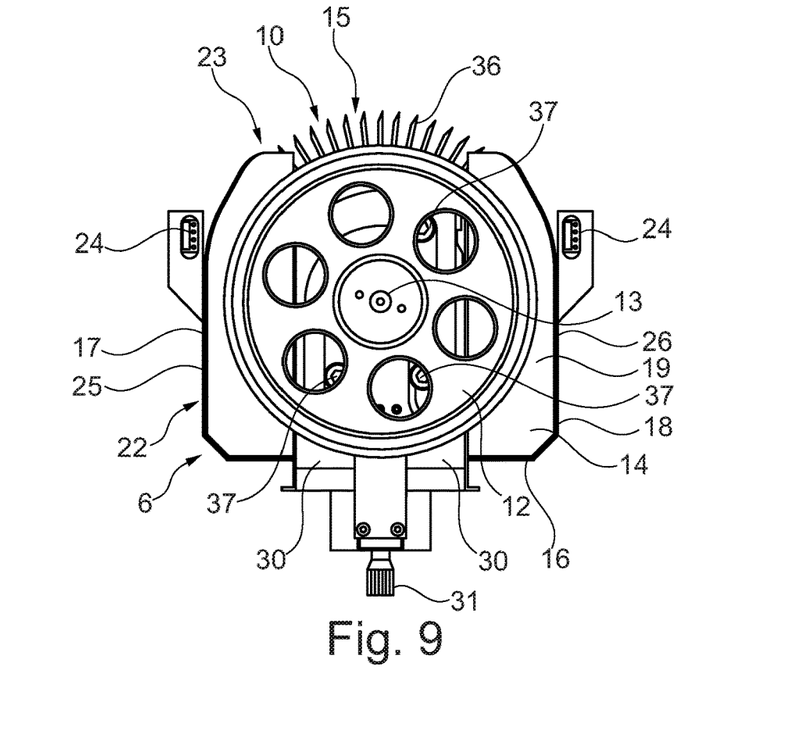
FIG. 9 shows an end view of a sanding head

FIG. 9 shows a sanding head 6 seen from the first end 19, where the contact wheel 12 is placed on the outside 22 of the shielding housing 14 and where a number of sanding strips 36 from the abrading drum 10 can be seen protrude through the opening 23 in the shielding housing 14.

What also can be seen from the figure is the suspensions means 30 for the contact wheels 12 in a form of an adjustment sliding guide 37. By adjusting the contact wheels 12 position within this adjustment sliding guide 37, the contact wheel 12 is then adjusted according to the abrading drum 10 with its sanding strips 36 and thereby controls the abrading contact.

The sensing means 24 on the first side 25 and the second side 26 of the abrading drum 10 is also shown, by use of which it is possible to measure the distance to the surface 7 as previously explained at FIG. 8.

Figure 10:
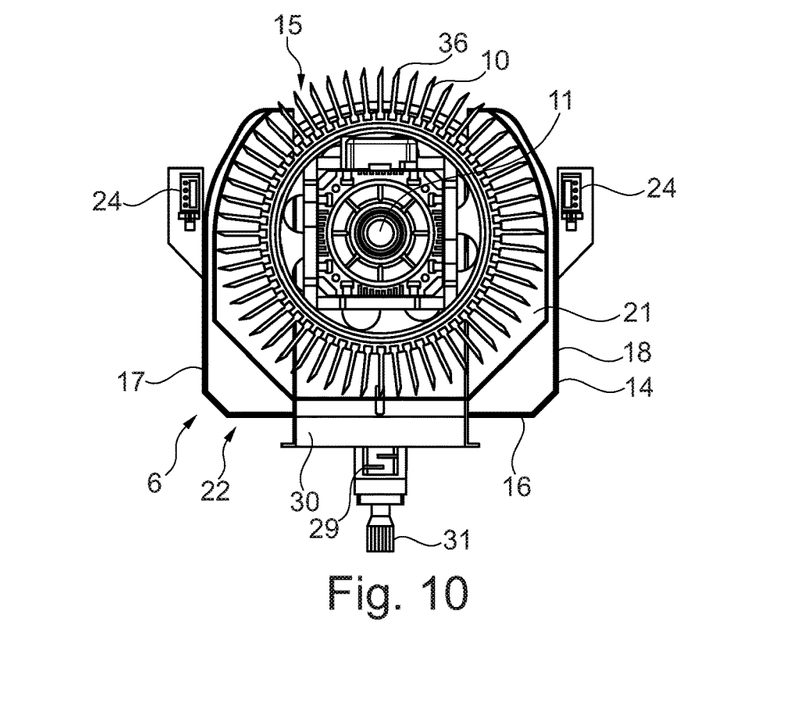
FIG. 10 shows an end view of a sanding head without contact wheel

FIG. 10 shows an end view of a cross section of a sanding head 6 without the contact wheel 12 and where the abrading drum 10 can be seen at the inside 21 of the shielding housing 14.

Figure 11:
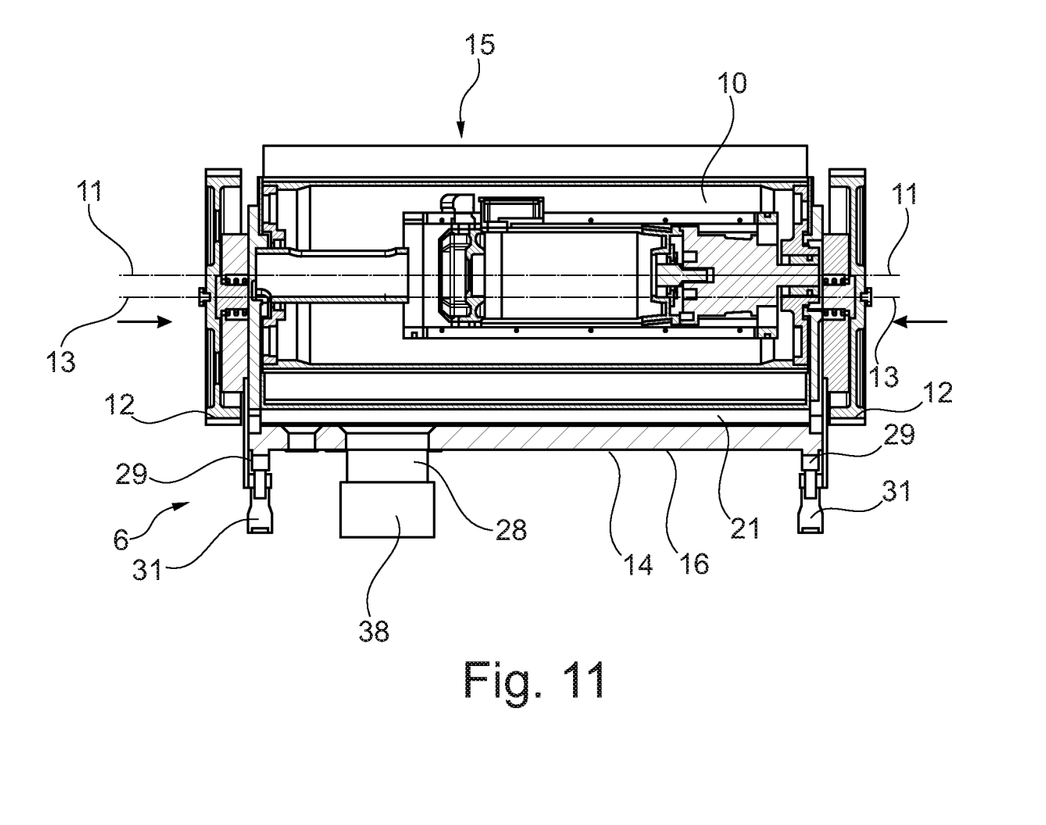
FIG. 11 shows a cross sectional view of a sanding head

FIG. 11 shows a cross sectional view of a sanding head 6, where the cross sectional view is along and through the centre axis 11 of the abrading drum 10 at the inside 21 of the shielding housing 14. The figure further shows a blower 38 connected to the dust extraction outlet 28.

Figure 12:
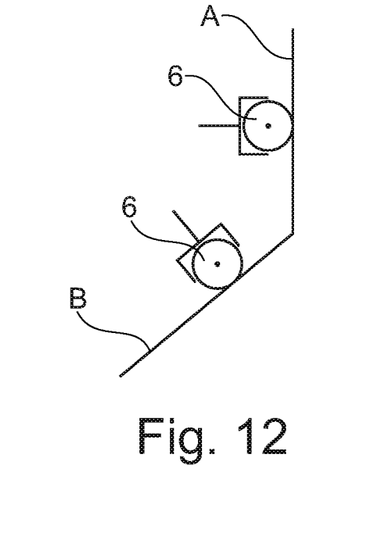
FIG. 12 shows the principle in which constant velocity

FIG. 12 shows the principle in which constant velocity at the surface is achieved. The velocity for the movement of the sanding head 6 is decided from the position of the tilt device 39. Where the vertical velocity at A e.g. is 1, the vertical velocity at B is <1, due to the fact that the electrically driven horizontal arm 4 at the same time moves the sanding head 6 in the horizontal direction. The vertical velocity at B is thus regulated and reduced in relation to the vertical velocity at A to be able to keep the same and a constant velocity as A due to the use of the tilt device 39 of the sanding head 6.

Figure 13:
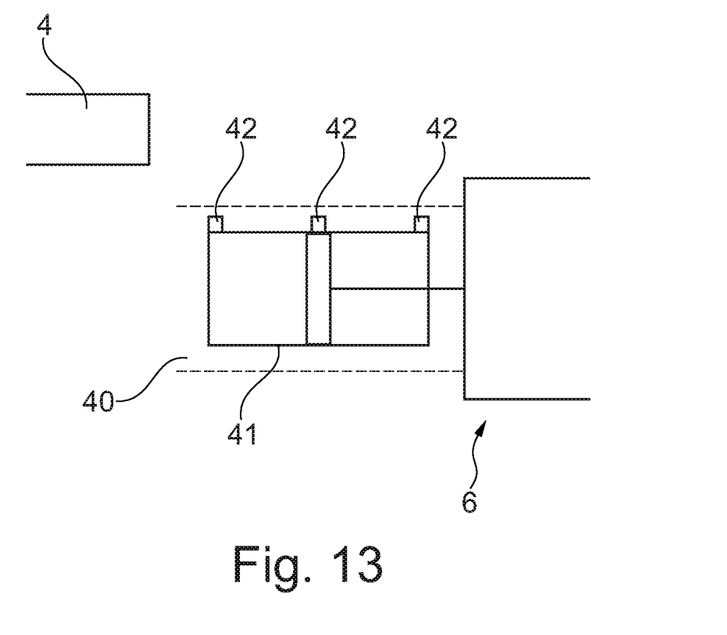
FIG. 13 shows the principle of the abrasion pressure

FIG. 13 shows the principle of the abrasion pressure 40 with the abrasive pressure cylinder 41 and the absolute encoder 42. What is indicated and what also can be seen from FIG. 8 is that the sanding head 6 is connected to the abrasion pressure 40 at one end and that the horizontal arm 4 therefore is connected to the other end via the not shown tilt device 39.

The invention claimed is:

1. An abrasion arrangement configured for surface treatment with constant velocity at a surface, where the abrasion arrangement comprises at least a sanding head, wherein the sanding head is connected to at least an abrasion pressure comprising at least an abrasive pressure cylinder with an absolute encoder, where the abrasion pressure is further connected to at least a tilt device which is further connected to a structural construction comprising a horizontal arm and an horizontal actuator further comprising drive means, and where at least the horizontal arm is even further connected to a vertical arm with drive means.

2. An abrasion arrangement configured for surface treatment with constant velocity at the surface, according to claim 1, wherein the absolute encoder has a 70 mm linear moving distance with a set point at 35 mm.

3. An abrasion arrangement configured for surface treatment with constant velocity at the surface, according to claim 1, wherein the abrasion arrangement further comprises at least one of a load sensor and a distance sensor.

4. Sanding head for an abrasion arrangement according to claim 1, where the sanding head comprises an abrading drum with a centre axis, where said abrading drum is arranged rotatable about said centre axis, wherein the sanding head further comprises at least a contact wheel at opposite ends of the abrading drum, where the contact wheels have the same centre axis or substantially the same centre axis as the centre axis of the abrading drum, and where the sanding head comprises a suspension swivel arrangement, and where the sanding head comprises at least one load sensor connected to at least one contact wheel.

5. Sanding head for an abrasion arrangement, according to claim 4, wherein at least one load sensor is connected to at least one contact wheel at opposite ends of the abrading drum.

6. Sanding head for an abrasion arrangement, according to claim 4, wherein the sanding head further comprises suspension means for the contact wheels where the suspension means comprises adjusting screws or adjustment means.

7. Sanding head for an abrasion arrangement, according to claim 4, wherein the sanding head further comprises at least one distance sensor at either a first side or a second side of the abrading drum.

8. Sanding head for an abrasion arrangement, according to claim 4, wherein the sanding head further comprises a shielding housing comprising a front, a back, a first side and a second side, a first end and a second end, an inside, an outside and where the front has an opening to the inside of the shielding house where the abrading drum is positioned and where the abrading drum has its centre axis between the first end and the second end of the shielding housing, where the contact wheels are positioned at the first end and the second end on the outside of the shielding housing, and where the suspension swivel arrangement is positioned at the back of the shielding housing, and where the shielding housing further comprises a dust extraction outlet.

9. Sanding head for an abrasion arrangement, according to claim 4, wherein the sanding head further comprises a blower connected to the a dust extraction outlet.

10. Use of the abrasion arrangement according to claim 1 for abrading surface treatment of wind turbine blades.

11. Use of the abrasion arrangement according to claim 10, wherein each of the wind turbine blades has a trailing edge and a leading edge, and wherein the sanding head moves from an upper position close to a top of the trailing edge to a lower position close to a bottom of the leading edge.

* * * * *